United States Patent [19]

Senor

[11] 3,902,149

[45] Aug. 26, 1975

[54] MOTOR PROTECTOR APPARATUS

[75] Inventor: Ronald E. Senor, Norton, Mass.

[73] Assignee: Texas Instruments, Incorporated, Dallas, Tex.

[22] Filed: Oct. 7, 1974

[21] Appl. No.: 512,816

[52] U.S. Cl. ............... 337/110; 337/97; 337/112
[51] Int. Cl. ......................................... H01h 61/01
[58] Field of Search ....... 337/89, 97, 108, 110, 112, 337/362, 365

[56] References Cited
UNITED STATES PATENTS

| | | | |
|---|---|---|---|
| 3,104,296 | 9/1963 | Moksu et al. | 337/112 |
| 3,194,924 | 7/1965 | Moksu et al. | 337/89 |
| 3,453,577 | 7/1969 | D'Entremont | 337/110 |
| 3,621,568 | 11/1971 | D'Entremont et al. | 337/112 |

Primary Examiner—Harold Broome
Attorney, Agent, or Firm—Russell E. Baumann; John A. Haug; James P. McAndrews

[57] ABSTRACT

A motor protector actuable by thermally-responsive means to open electrical contacts is particularly adapted for use embedded in a motor winding where arcs occurring during opening of such contacts would tend to be strongly affected by magnetic fields established within the motor winding. The protector is provided with special means for intercepting and depressing such arcs for shielding the thermally-responsive means from such arcs, whereby the thermally-responsive means retains its thermal response characteristics throughout a long service life.

7 Claims, 3 Drawing Figures

PATENTED AUG 26 1975　　3,902,149

MOTOR PROTECTOR APPARATUS

BACKGROUND AND SUMMARY OF INVENTION

Small sealed motor protectors of conventional design having snap-acting thermally-responsive bimetallic members have been successfully used in a wide variety of motor protecting applications where the protectors have been tied externally to the motor. In such applications, however, relatively long electrical leads have been required for connecting the motor protector in its electrical circuit. On the other hand, where such motor protectors have been embedded in a motor winding and insulated therefrom to permit use of relatively shorter motor protector leads, it has sometimes been found that the motor protectors have failed after a relatively short service life.

It is believed that the relatively short service life of such motor protectors embedded in motor windings is due to the presence of strong magnetic fields within the motor windings. That is, it is believed that, when motor protectors are tied externally to a motor, the protector device tends to be at least partially shielded from such magnetic fields by the motor frame and the like but that, when the motor protector is embedded within the motor winding, the presence of these strong magnetic fields sometimes causes severe arcing within the motor protector during opening and closing of the motor protector contacts, this arcing tending to create arcing tracks on the thermally responsive bimetal in the protector and altering the thermal response characteristics of the bimetal so that the protector device fails after a relatively short service life.

It is an object of this invention to provide a novel and improved motor protector device, to provide such a motor protector which can be embedded in a motor winding and used in the presence of strong magnetic fields within the motor winding, and to provide such a motor protector which is of simple, rugged, and economical construction.

Other objects, advantages and details of the motor protector device appear in the following detailed description of preferred embodiments of this invention, the detailed description referring to the drawings in which.

Figure 1:
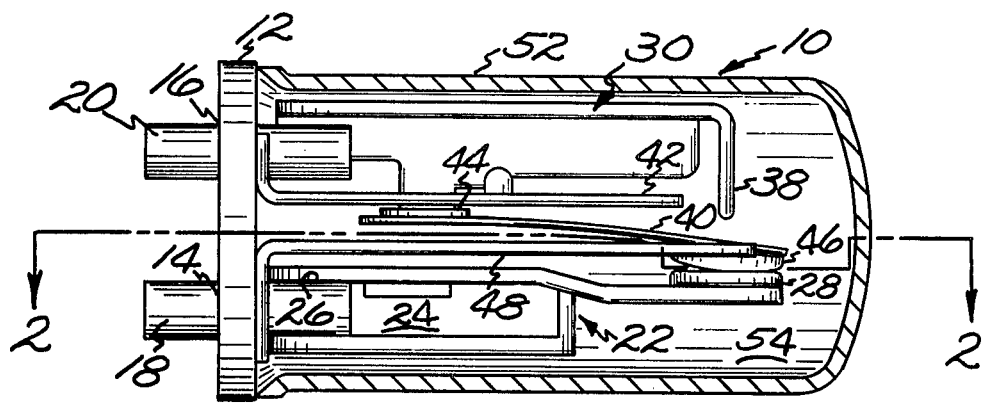
FIG. 1 is a side elevation of an apparatus according to this invention showing the casing of the device partly cut away.

Referring to the drawings, 10 in FIG. 1 indicates the novel and improved motor protector of this invention which is shown to include a generally disc-shaped headerplate or member 12 having two apertures 14, 16 and having terminal posts 18, 20 secured in the respective plate apertures 14, 16 in insulated relation to the headerplate by means of an insulating material such as glass (not shown). The headerplate 12 and terminal posts 18, 20 are preferably formed of a rigid electrically conductive material such as steel or the like. As the terminal posts can be mounted in the headerplate by any number of well-known techniques, sealing of the terminal posts in the headerplate is not further described herein.

Figure 2:
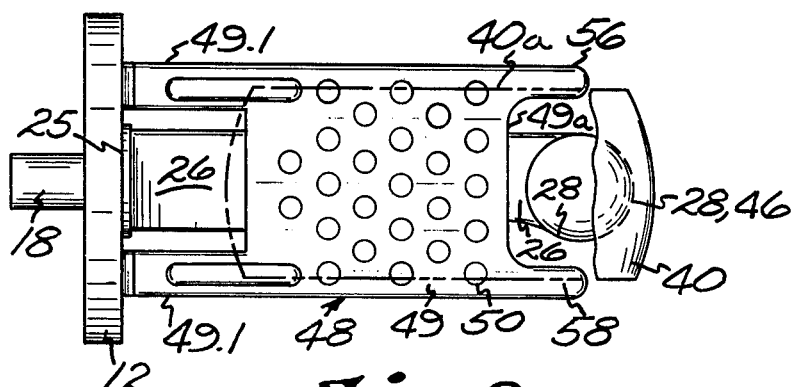
FIG. 2 is a section view along line 2—2 of FIG. 1 with outer casing removed and with bimetallic member partly cut away and with the extent of the bimetallic member indicated in broken lines.

As shown, the motor protector further includes a rigid electrically conductive contact arm 22, formed of steel or the like, the arm including one flange portion 24 which is welded to one side of the terminal post 18 and including an angularly disposed flange portion 26 which extends in cantilever relation from the post in a plane generally parallel to the terminal post. Positioned between the bottom of contact arm 22 and headerplate 12 is an insulating bushing 25 as shown in FIG. 2. A fixed contact 28 preferably formed of a material of high conductivity such as silver is welded or otherwise secured to the distal end of the flange 26 of the contact arm as shown.

Figure 3:
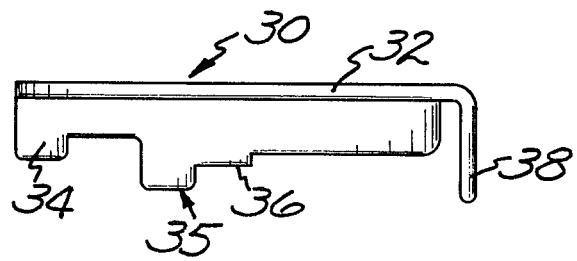
FIG. 3 is a side elevation view of main winding heater element used in the device of FIG. 1.

The motor protector further includes a main winding heater element 30 which extends from the terminal post 20 in cantilever relation as shown in FIG. 1 with a first flange portion 32, a second flange portion 34, having an extending portion 35 and a notched out section 36 and a stopper end portion 38 formed of the end of the flange 32 as shown by FIG. 3. The second flange part 34 is welded onto terminal post 20 to attach the main winding heater to the post while the extending part of this flange 35 with the notched out section 36 is used as a welding tab for a snap-acting bimetallic member 40 and a start-winding heater 42 to be discussed in further detail below. The stopper end portion 38 of the main winding heater element is used as a positive stop for the bimetallic member 40. The main winding heater element 30 is formed of any one of a variety of materials of selected electrical conductivities so that the element is adapted to generate a predetermined amount of heat in response to a selected amount of electrical current flowing through the element. For example, the heater element is preferably formed of rigid cold rolled steel to provide the element with selected electrical heating characteristics.

Also the motor protector preferably includes a start-winding heater element 42 which has one end attached to the notched section 36 of the second flange portion 34 and its other end attached to the headerplate 12. This heater element is also formed of any one of a variety of materials of selected electrical conductivity so that the heater element 42 is adapted to provide a predetermined amount of heat in response to selected flow of electrical current through the element.

As noted above, the motor protector also includes an electrically conductive resilient thermally-responsive snap-acting member of disc 40 which is welded to one flange of an angular support 44 as shown in FIG. 1 which in turn has its second flange welded to the second flange portion 34 of the main winding heater element 30. The support 44 is angle-shaped and made out of an electrically conductive material such as cold rolled steel. A movable contact 46 preferably formed of the same material as the fixed contact is welded or otherwise secured to the thermally responsive member 40 oppositely of the support 44. The welding of the support 44 between the main winding heater element 30 and thermally responsive member 40 disposing the member in selected heat transfer relation to the heater elements and locates the member extending in cantilever relation from the heaters so that the movable contact 46 engages and disengages the fixed contact 28 in response to snap-acting movement of the member.

In accordance with this invention, arc control grid member 48 having a plate portion 49 and angular extending arms 49.1 has the arms 49.1 welded to the headerplate 12, as best shown in FIG. 2, so that the plate portion 49 of the grid 48 is positioned between the contact arm 22 which holds the stationary or fixed contact 28 and the snap-acting disc 40 which holds the movable contact 46. The plate portion 49 of the grid extends away from headerplate 12 as shown by FIG. 2 to an extent shown at 49a closely adjacent to the two contacts 28 and 46 and has a width relatively greater than that of the bimetallic member (the bimetallic member 40 being shown partly cut away in FIG. 2 and the width and extent of the bimetallic member relative to the grid plate 49 being depicted in FIG. 2 by broken lines 40a), the grid is disposed to intercept any straight line that an arc might follow between fixed contact 28 and the bimetallic disc. The grid preferably has two top side extensions 56 and 58 at the distal end of the grid plate portion 49 further extending along respective sides of the contacts 28 and 46 to more thoroughly assure interception of arcs partly beyond the center of the contacts for protecting the disc 40. The two top side extensions 56 and 58 of the grid plate partially surround the contacts to contain the arcing as illustrated. These side extensions 56 and 58 extend at least to the height of the midpoint of the contacts (fixed and movable) and have a width that extends as far laterally as the plate portion 49.

Additionally the grid 48 is preferably perforated with holes 50 to more effectively disperse arcs intercepted by the grid. That is, after an arc hits the grid 48, its most direct travel path toward the grounding headerplate 12 will be interrupted by holes 50 so that the arc must travel around or jump over the holes 50 and therefore will have a longer energy dissipating path to follow in reaching the headerplate. Preferably, the holes 50 are of sufficiently small size so that there will be no tendency for arcs to pass through the holes and strike the bimetallic disc member 40. In this way, the grid 48 protects the bimetallic snap-acting member 40 which will otherwise quickly lose its thermal response characteristics or calibration if the disc were to be subjected to impingement of arcs during opening and closing of the motor protector controls. That is, when an arc does occur between opening or closing contacts of the motor protector, the arc would normally tend to ground out on the nearest possible conductive member. However, where the grid 48 of the motor protector of this invention is positioned as above-described the grid very effectively protects the bimetallic member from such arcs. Further, when the arc is intercepted by the grid, the energy of the arc is partially dispersed by the perforations before it grounds out to the headerplate. The separate mounting of the grid on the headerplate avoids any possible interference with the movement of disc 40 and assures that all arcs are intercepted by the grid without risk of the arcs jumping the space gap between the grid and the disc 40 to cause deterioration of the edges of the bimetallic member.

A cup-shaped body 52 formed of steel or other rigid material has its rim welded in electrically conductive relation to the headerplate 12 to form a device chamber 54, this weld serving to seal the device chamber 54 so that the motor protector is completely sealed and pressure resistant.

With this construction, the motor protector is economically constructed to display precisely predetermined thermal response properties. The device is rugged and inexpensive, is hermetically sealed and pressure-resistant, is vibration-resistant so that the device does not tend to open or close a circuit inadvertently even when exposed to substantial vibrational forces. The motor protector also has the arc depressant means above-described to virtually eliminate deterioration of the thermally responsive bimetallic member such as might be caused by excessive arcing when the motor protector is embedded in a motor winding.

It should be understood that although particular embodiments of the motor protector have been described by way of illustration, modifications of structure could be made within the scope of this invention. This invention includes all modifications and equivalents of the illustrated embodiments of the inventions which fall within the scope of the appended claims.

I claim:

1. A motor protector comprising an electrically conductive header member having a plurality of portions including a metal plate part and at least one terminal means, said header portions each being mounted in electrically insulated relation to each other, a rigid electrically conducting contact arm and a rigid electrically conductive heater element secured to respective portions of said header in electrically insulated relation to each other to extend in cantilever relation from said header, a fixed contact mounted at the distal end of said arm, an electrically conductive thermally responsive snap-acting member secured at one end in electrically conductive relation to said element and having a movable contact secured at an opposite end of said member, said thermally responsive member being of a dished configuration and being adapted to move to an inverted dished configuration when subjected to a selected temperature for moving said movable contact into and out of engagement with said fixed contact, and a grid member mounted on said header to extend in cantilever relation therefrom in spaced relation to said arm and said thermally responsive member to shield said thermally-responsive member from electrical arcs occuring between said contacts during movement of said movable contact.

2. A motor protector as set forth in claim 1 wherein the grid member is perforated so that an electrical path extending between the distal and support ends of the grid have a length greater than the length of the grid.

3. A motor protector as set forth in claim 2 wherein a cup-shaped body having an open end with a rim which is welded at said rim in sealed relation to said header member for enclosing the heater, arc control grid, contacts and thermally-responsive members.

4. A motor protector comprising a header member, two terminals mounted on said header member in electrically insulated relation to each other and to said header member, a rigid electrically conducting metallic contact arm, a rigid electrically conductive heater element, said arm and element each being secured to one of said terminals to extend in cantilever relation therefrom, a fixed contact mounted at the distal end of said arm, an electrically conductive thermally responsive snap-acting member secured at one end to said heater element and having a movable contact secured at the opposite end of said member, said member being of the dish shaped configuration and being adapted to move to an inverted dished configuration when subjected to a selected temperature for moving said movable contact into and out of engagement with said fixed contact, and an electrically conductive arc control member mounted on said header to extend in cantilever relation from the headerplate between said contact arm and said thermally responsive member to protect said thermally responsive member from arcs occurring during the movement of said movable contact into and out of engagement with said fixed contact.

5. A motor protector as set forth in claim 4 wherein said arc control grid member has a plate portion extending away from the headerplate to a point closely adjacent to said fixed contact, having a width at least as great as said thermally responsive member and having two portions extending from the distal end of said plate portion to a height at least equal to the midpoint of said fixed contact.

6. A motor protector as set forth in claim 5 wherein the grid member is perforated so that an electrical path extending between the distal and support ends of the grid have a length greater than the length of the grid.

7. A motor protector as set forth in claim 6 wherein a cup-shaped body having an open end with a rim which is welded at said rim in sealed relation to said header member for enclosing the heater, arc control grid, contacts and thermally responsive members.

* * * * *